US011376787B2

(12) United States Patent
Rademacher et al.

(10) Patent No.: US 11,376,787 B2
(45) Date of Patent: Jul. 5, 2022

(54) ADDITIVE MANUFACTURING METHOD AND APPARATUS FOR THE PRODUCTION OF DENTAL CROWNS AND OTHER OBJECTS

(71) Applicant: Carbon, Inc., Redwood City, CA (US)

(72) Inventors: Soren Rademacher, Chapel Hill, NC (US); David Shirvanyants, Chapel Hill, NC (US); Stephen Paul Land, Raleigh, NC (US); Henry Quarles Bibb, III, Zebulon, NC (US); Alexander Ermoshkin, Pittsboro, NC (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/594,007

(22) PCT Filed: Apr. 23, 2020

(86) PCT No.: PCT/US2020/029430
§ 371 (c)(1),
(2) Date: Sep. 30, 2021

(87) PCT Pub. No.: WO2020/256825
PCT Pub. Date: Dec. 24, 2020

(65) Prior Publication Data
US 2022/0088861 A1    Mar. 24, 2022

Related U.S. Application Data

(60) Provisional application No. 62/862,732, filed on Jun. 18, 2019.

(51) Int. Cl.
*B29C 64/218* (2017.01)
*B29C 64/165* (2017.01)
(Continued)

(52) U.S. Cl.
CPC .......... *B29C 64/165* (2017.08); *B29C 64/218* (2017.08); *B29C 64/232* (2017.08);
(Continued)

(58) Field of Classification Search
CPC .... B29C 64/218; B29C 64/321; B29C 64/343
See application file for complete search history.

(56) References Cited

U.S. PATENT DOCUMENTS 4,796,559 A * 1/1989 Lohse .................... D06B 1/143
                                                                  118/210
4,961,901 A * 10/1990 Wullenweber ............ B22F 3/18
                                                                  419/45
(Continued)

FOREIGN PATENT DOCUMENTS

| CN | 109333993 A | 2/2019 |
| EP | 1270185 A1 | 1/2003 |
| WO | 9325336 A1 | 12/1993 |

OTHER PUBLICATIONS

International Preliminary Report on Patentability corresponding to PCT/US2020/029430; dated Sep. 13, 2021 (15 pages).
(Continued)

*Primary Examiner* — Timothy Kennedy
(74) *Attorney, Agent, or Firm* — Myers Bigel, P.A.

(57) ABSTRACT

The present disclosure describes an additive manufacturing apparatus. The apparatus includes a chamber (11) having a planar circumferential top edge portion (12) defining a chamber orifice (13); a stage (15) movably positioned in the chamber (11), the two together configured to receive a viscous resin; a dispenser (30) facing the stage (15) and operatively associated therewith, the dispenser (30) configured to apply a planar coating of viscous resin; a primary drive (22) operatively associated with the dispenser (30) and chamber (11), the primary drive (22) configured to move the dispenser (30) across the chamber orifice (13); a light engine
(Continued)

(40) facing the stage (15) and operatively associated therewith, the light engine (40) configured to expose a coating of resin on the stage (15) planar top surface (12) to patterned light; and a stage drive (24) operatively associated with the stage (15) and configured to retract the stage (15) into the chamber (11), following exposure of a coating of resin. Methods of making a three-dimensional object by additive manufacturing are also described.

12 Claims, 7 Drawing Sheets

(51) Int. Cl.
| | |
|---|---|
| *B29C 64/245* | (2017.01) |
| *B29C 64/232* | (2017.01) |
| *B29C 64/264* | (2017.01) |
| *B29C 64/255* | (2017.01) |
| *B33Y 70/10* | (2020.01) |
| *B33Y 80/00* | (2015.01) |
| *B33Y 30/00* | (2015.01) |
| *B33Y 10/00* | (2015.01) |
| *B29L 31/00* | (2006.01) |

(52) U.S. Cl.
CPC .......... *B29C 64/245* (2017.08); *B29C 64/255* (2017.08); *B29C 64/264* (2017.08); *B33Y 10/00* (2014.12); *B33Y 30/00* (2014.12); *B33Y 70/10* (2020.01); *B33Y 80/00* (2014.12); *B29L 2031/7536* (2013.01)

(56) References Cited

U.S. PATENT DOCUMENTS

| | | | |
|---|---|---|---|
| 5,902,537 A | 5/1999 | Almquist et al. | |
| 5,922,364 A * | 7/1999 | Young, Jr. | B29C 64/135 |
| | | | 264/401 |
| 6,764,636 B1 * | 7/2004 | Allanic | B29C 41/12 |
| | | | 118/100 |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 10,207,326 B2 * | 2/2019 | Park | B22F 3/18 |
| 11,141,919 B2 * | 10/2021 | Lin | B29C 64/336 |
| 11,192,302 B2 * | 12/2021 | Rademacher | B29C 64/35 |
| 2018/0215079 A1 * | 8/2018 | Hakkaku | B29C 64/218 |
| 2019/0193150 A1 * | 6/2019 | Hudelson | B33Y 10/00 |
| 2019/0366433 A1 * | 12/2019 | Aydin | B22F 10/40 |

OTHER PUBLICATIONS

International Search Report and Written Opinion corresponding to PCT/US2020/029430; dated Jul. 20, 2020 (13 pages).
Corral-Núnez, Camila, et al., "State of the art of bulk-fill resin-based composites: A Review", Rev Fac Odontol Univ Antioq 27(1), 2015, 177-196.
Janusziewicz, Rima, et al., "Layerless fabrication with continuous liquid interface production", PNAS, 113, 2016, 11703-11708.
Poelma, Justin, et al., "Rethinking digital manufacturing with polymers", Science, 358(6369), 2017, 1384-1385.
Tumbleston, John R., et al., "Continuous liquid interface production of 3D Objects", Science, 347(6228), 2015, 1349-1352.

* cited by examiner

ADDITIVE MANUFACTURING METHOD AND APPARATUS FOR THE PRODUCTION OF DENTAL CROWNS AND OTHER OBJECTS

CROSS REFERENCE TO RELATED APPLICATIONS

This application is a 35 U.S.C. § 371 national phase application of International Application Serial No. PCT/US2020/029430, filed Apr. 23, 2020, which claims priority from and the benefit of U.S. Provisional Application Ser. No. 62/862,732, filed Jun. 18, 2019, the disclosure of which is hereby incorporated herein in its entirety.

FIELD OF THE INVENTION

The present invention concerns additive manufacturing methods and apparatus, particularly those adapted for the production of products comprised of sintered particles such as dental crowns, dental implants, precision ceramic and metal parts, and the like.

BACKGROUND OF THE INVENTION

Additive manufacturing has emerged as an important technology that is revitalizing the manufacturing industry. The introduction of processes sometimes referred to as "continuous liquid interface production" (or "CLIP"), coupled with the introduction of dual cure additive manufacturing resins, have added significant energy to the development of new approaches in this field. See J. Tumbleston et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; and R. Janusziewicz, et al., *Layerless fabrication with continuous liquid interface production*, PNAS 113, 11703-11708 (18 Oct. 2016); See also Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017). Nevertheless, some end products require the use of highly viscous—indeed paste-like—resins, which remain difficult to handle in current processes, or at least slow current processes. Accordingly, there remains a need for new approaches to additive manufacturing.

SUMMARY OF THE INVENTION

A first aspect of the invention is an additive manufacturing apparatus. The apparatus may include a chamber having a planar circumferential top edge portion defining a chamber orifice; a stage movably positioned in the chamber, the stage having a planar top surface portion alignable with the chamber planar circumferential edge portion, the two together configured to receive a viscous resin; a dispenser facing the stage and operatively associated therewith, the dispenser configured for applying a planar coating of viscous resin to the stage planar top surface portion; a primary drive operatively associated with the dispenser and the chamber, the primary drive configured for moving the dispenser across the orifice; and a light engine facing the stage and operatively associated therewith, the light engine configured to expose a coating of resin on the stage planar top surface to patterned light; and a stage drive operatively associated with the stage and configured to retract the stage into the chamber, following exposure of a coating of resin on the stage to patterned light.

In some embodiments, the dispenser includes a resin reservoir, an applicator roller operatively associated with the reservoir, and a roller drive operatively associated with the applicator roller.

In some embodiments, the applicator roller and roller drive are configured to be reversible between: (i) a first direction in which resin is pumped from the reservoir onto the stage (while the resin dispenser is optionally but preferably stationary); and (ii) a second (preferably counter-rotating) direction in which excess resin is pumped from the stage into the reservoir while the resin dispenser moves across the orifice to provide a smooth planar coating of the resin on the stage for subsequent exposure to patterned light.

In some embodiments, the light engine is positioned above the stage.

In some embodiments, the light engine and/or the chamber is fixed and stationary.

In some embodiments, the light engine comprises an ultraviolet (UV) light source.

In some embodiments, the roller is configured to completely span the chamber orifice.

In some embodiments, the resin comprises a pseudoplastic paste.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Apparatus

Figure 1A:
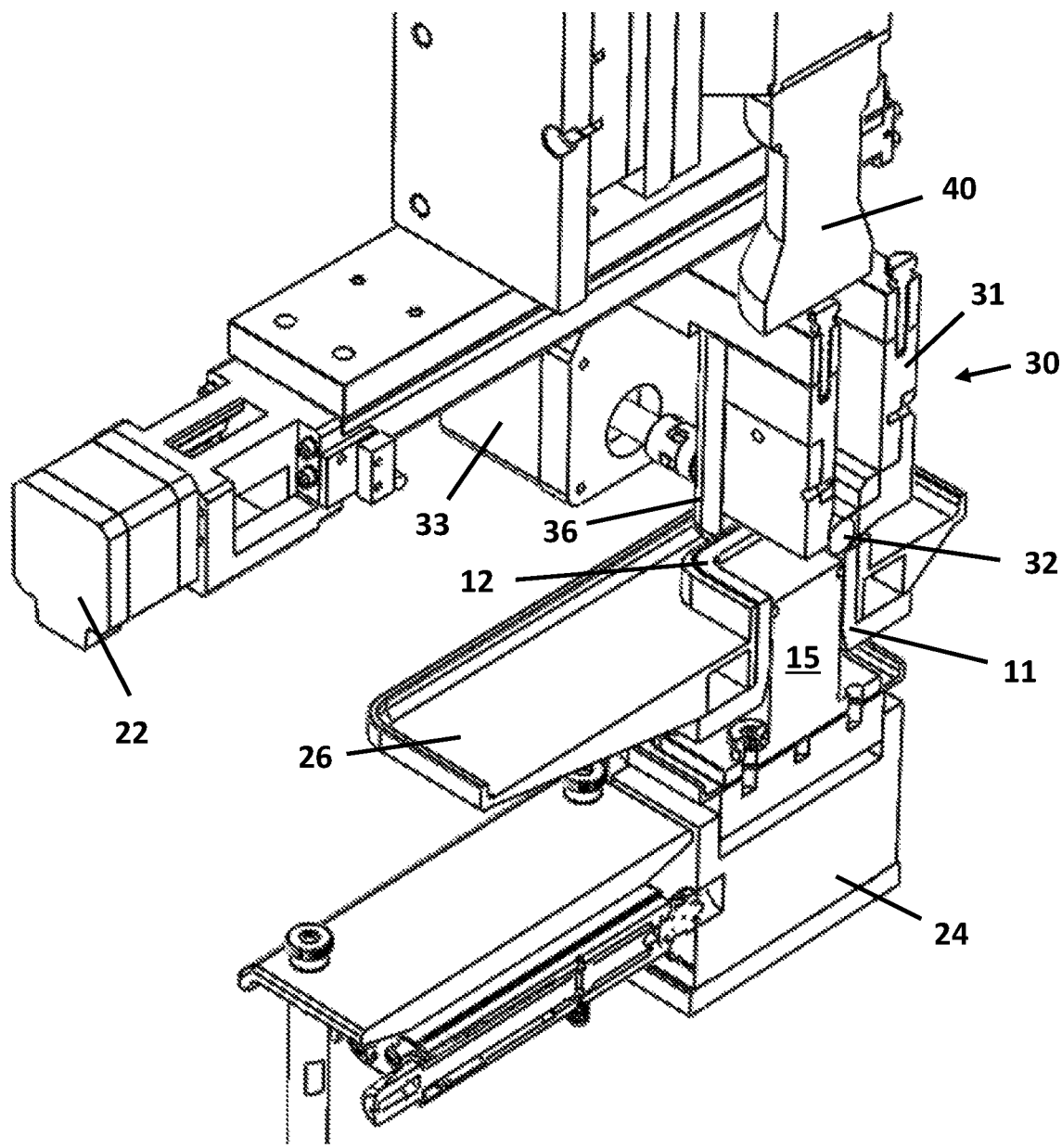
FIG. 1A is a perspective, sectional view of one embodiment of an apparatus as described herein.
Figure 1B:
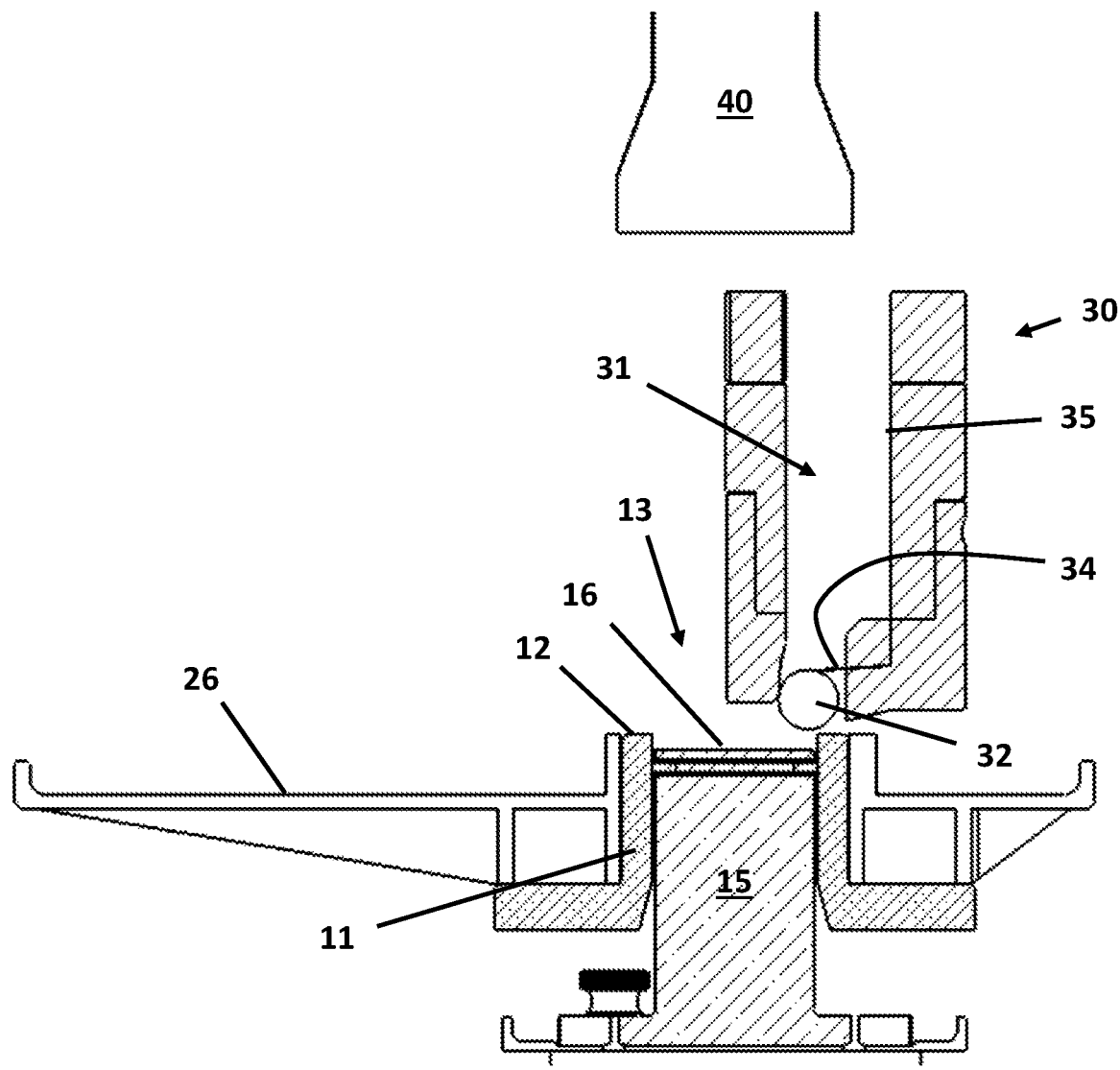
FIG. 1B is a side sectional view of an embodiment of an apparatus as described herein.

As illustrated in FIGS. 1A-1B, a non-limiting embodiment of an additive manufacturing apparatus includes a chamber (11) having a planar circumferential top edge portion (12) defining a chamber orifice (13). A stage (15) is movably positioned in the chamber (the two together forming a piston), with the stage (15) having a planar top surface portion (16). The stage (15) top surface portion (16) is alignable with the chamber (11) planar circumferential top edge portion (12) so that the two together are configured to receive a viscous resin. A skirt or catch basin (26) can surround the chamber (11) to catch excess resin that may flow out of, or be ejected from, the chamber (11).

A dispenser (30) faces the stage (15) and is operatively associated therewith, the dispenser configured to apply a planar coating of viscous resin to the said stage (15) planar top surface portion (12). In addition, a light engine (40) also faces the stage (15), and is and operatively associated therewith, with the light engine (40) configured to expose a coating of resin on the stage (15) planar top surface (12) to patterned light. Any suitable light engine (40) can be used, preferably one with an ultraviolet light source. In some embodiments, a Wintech PRO6500 light engine can be used (available from Wintech Digital Systems Technology Corp.).

A primary drive (22) is operatively associated with the dispenser (30) and the chamber (11), the primary drive (22) configured for moving the dispenser (30) across the orifice (13) (e.g., so that the resin coating is not obscured from the light engine (40) by the dispenser (30)); and a stage drive (24) is operatively associated with the stage (15) and configured to retract the stage (15) into the chamber (11), following exposure of a coating of resin on said stage (15) to patterned light (thereby positioning the stage (15) and the hardened coating to receive a subsequent coating of resin, as discussed further below).

The primary drive (22) can be any suitable device, but in some embodiments is a linear actuator (such as an LM Guide Actuator, available from THK Co. LTD, Tokyo, Japan) coupled to a suitable motor (e.g., a PKP244MD15A-R2F-L/KR26-FLNG-R/XGL2-19C-5-5, 42 mm 0.9° Stepper Motor with Encoder, available from Oriental Motor USA Corp.).

In some embodiments, the stage (15) can be an MVN80 stage, and the stage drive (24) can be an LTA-HL motorized actuator, both available from Newport Corp.

In some embodiments, the dispenser (30) includes a resin reservoir (31), an applicator roller (32) operatively associated with the reservoir (31); a roller drive (33) operatively associated with the applicator roller (32), and a cleaning blade (34) such as a spring steel scraping blade positioned for removing resin from the applicator roller (32) when the applicator roller (32) is smoothing the resin coating. Opposite the cleaning blade (34) there can be a 0.01 inch gap between the applicator roller (32) and the reservoir wall (35), which allows the applicator roller (32) to move resin in and out of the reservoir (31) itself during deposition and smoothing of the resin. The applicator roller (32) itself may comprise a corrosion resistant shaft (such as a linear motion shaft available from McMaster-Carr, 9630 Norwalk Blvd., Santa Fe Springs, Calif. 90672-2932) mounted on suitable bearings (e.g., R62RS McMaster 60355K703 ABEC-1 bearings) (not shown).

Note that the applicator roller (32) preferably extends over the top edge portion (12) of the chamber (11) as well to ensure a good continuous coating. The resin deposited on the top edge portion (12) of the chamber (11) is removed during the cleaning pass and prevented from spilling over the sides by the walls (36) of the dispenser (30) which extend down past the top edge portion (12) of the chamber (11). Note particularly the dispenser (30) in FIG. 1A, where the dispenser wall (36) that is not cut away, facing back and to the left, extends down below the top edge portion (12) of the chamber (11).

Resins

Figure 2:
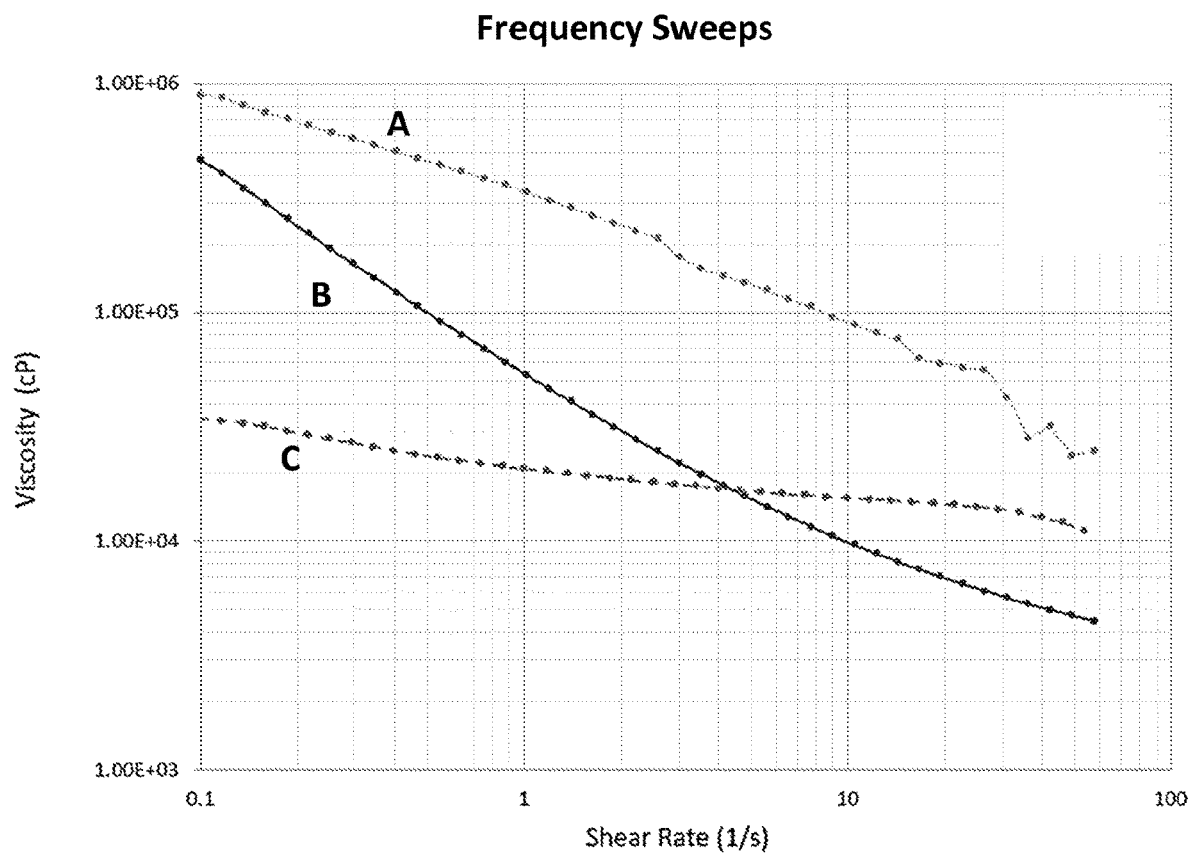
FIG. 2 gives frequency sweep rheology data for various resins A, B, C which may be used to carry out methods as described herein.

While any suitable, typically viscous, photopolymerizable resin can be used, in some embodiments the resin is in the form of a paste, and in some embodiments is a non-Newtonian, shear-thinning, or "pseudoplastic" paste. FIG. 2 shows frequency sweeps of three non-limiting examples of such photopolymerizable, pseudoplastic, pastes, A, B, and C. In general, pastes with steeper curves (indicating more prounounced pseudoplasticity) are currently preferred.

In some embodiments, such resins or pastes comprise an organic or inorganic particulate filler (e.g., sinterable particles such as metal particles, polymer particles, ceramic particles, etc., including combinations thereof) in combination with a photopolymerizable organic liquid matrix. The particulate filler can be included in the resin in any suitable amount, typically an amount of about 50 or 60 percent by weight to about 80 percent by weight, or more).

Suitable paste resins include, but are not limited to, bulk-fill composite resins (typically for dental restoration) such as described in C. Nunez et al., *State of the art of bulk-fill resin-based composites: A Review*, Rev Fac Odontol Univ Antioq 27(1): 177-196 (2015). Specific examples include, but are not limited to, Venus Bulk Fill (available from Heraeus Kultzer), Filltek Bulk-Fill flowable restorative (available from 3M ESPE), Surefil SDR flow (available from VOCO), Sonic Fill (available from Kerr), Tetric Evoceram Bulkfill (available from Ivoclar Vivadent), x-tra fil (available from VOCO), etc.

Methods

Figure 3A:
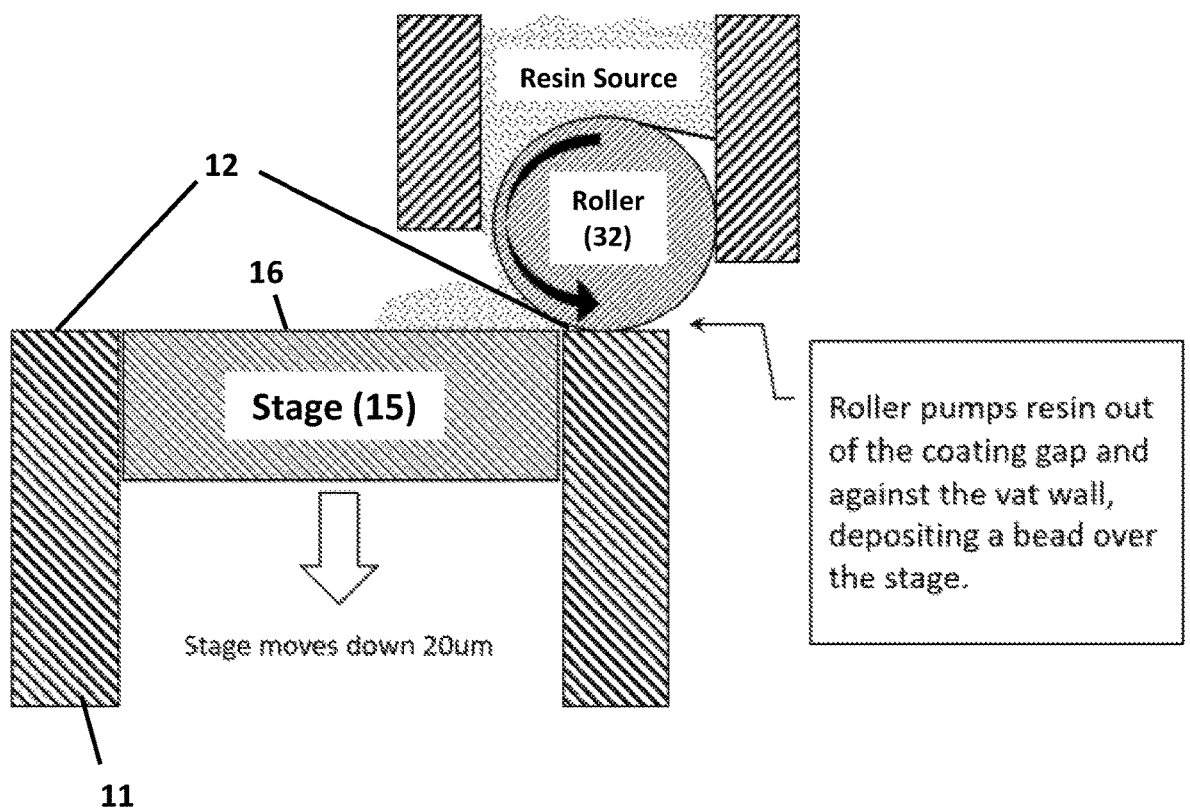
FIG. 3A schematically illustrates a dispensing (i.e., resin desposition) step of a method as described herein.
Figure 3B:
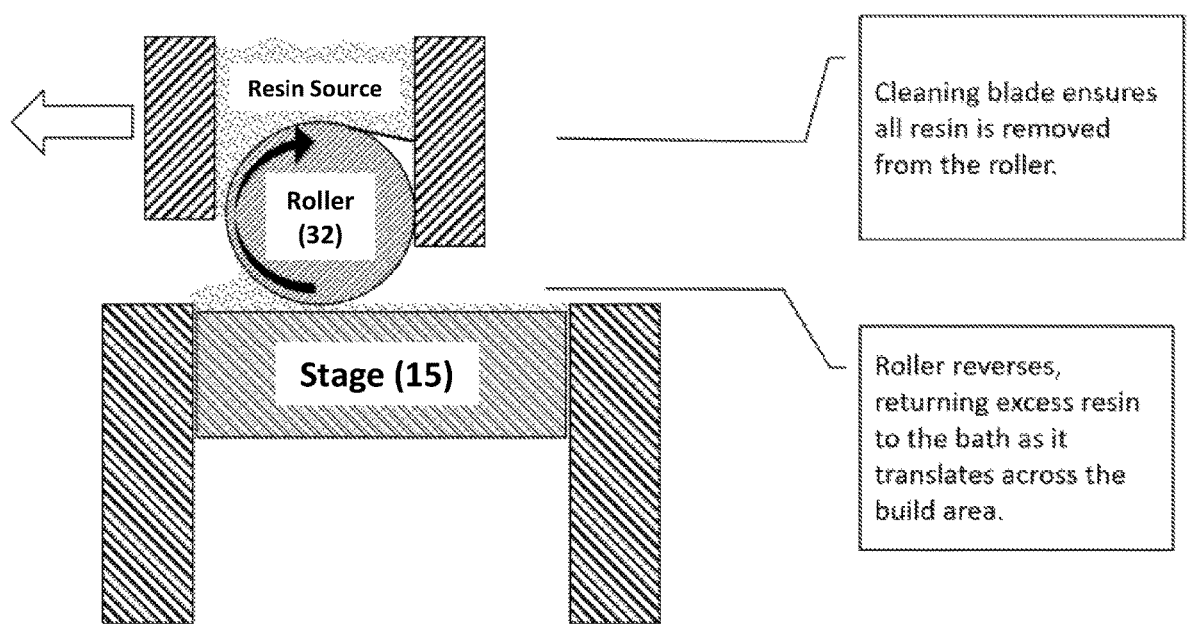
FIG. 3B schematically illustrates a coating and cleaning step of a method as described herein.
Figure 3C:
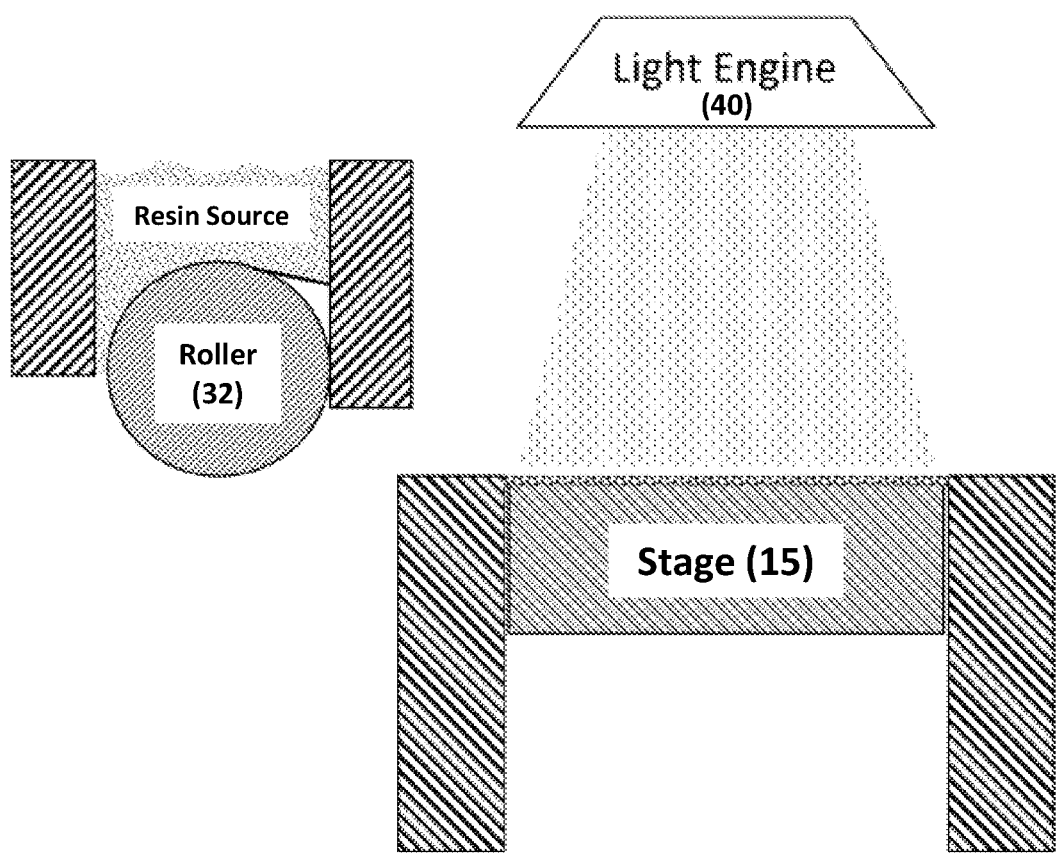
FIG. 3C schematically illustrates an exposing (i.e., curing) step of a method as described herein.

A method of making an object from resins as described above is schematically illustrated in FIGS. 3A-3C. In some embodiments, the method is carried out on an apparatus as described above.

In general, a method of making a three-dimensional object by additive manufacturing can include the steps of: (a) providing a chamber (11) having a planar circumferential top edge portion (12) defining a chamber orifice (13) with a stage (15) movably positioned in the chamber (11), the stage (15) having a planar top surface portion (16) alignable with the chamber (11) planar circumferential edge portion (12), the two together configured to receive a viscous resin; (b) retracting the stage (15) into the chamber (11); and (c) dispensing a portion of resin onto the stage (15) (before or after the retracting step); then (d) smoothing the dispensed resin on the stage (15) to form a planar coating of resin thereon; (e) exposing the coating to patterned light to form a hardened coating of the resin; (f) repeating steps (b) through (e) with successive portions of resin deposited onto each previously hardened coating until the object is formed.

At the start of the process, the stage (15) top surface (16) is preferably positioned at the same height as the chamber (11) walls. The stage (15) pulls down in suitable increments (for example, 20 µm increments) with each successive coating. It is currently preferred to retract the stage (15) before the dispensing step. However, in alternative embodiments, retracting can be carried out at any time, as long as the dispenser (30), and specifically the applicator roller (32), is at the correct height relative to the object being produced during the smoothing step.

In some embodiments, the dispensing step is carried out by pumping resin from a reservoir (31) with an applicator roller (32).

In some embodiments, the applicator roller (32) is positioned during the dispensing step so that resin is scraped from the applicator roller (32) onto the stage (15) by the chamber (11) top edge portion (12).

In some embodiments, the smoothing step is carried out by passing the applicator roller (32) across the stage (15) while counter-rotating the applicator roller (32).

In some embodiments (such as described in connection with apparatus above), the smoothing step is carried out with the applicator roller (32) completely spanning the chamber orifice (13).

Note the dispenser (30) can move across the build area at any suitable speed, in some embodiments about 25 millimeters per second. Similarly, the applicator roller (32) can spin at any suitable speed, in some embodiments at about 300 revolutions per minute. Without wishing to be bound to any specific theory of the invention, in some currently preferred embodiments, the applicator roller (32) tangential speed or velocity is greater than the speed or velocity at which the applicator roller (32) is moved across the build area, for example at least two or three times greater, to impart shear force to the resin top surface that enhances the smoothing thereof. Thus, in some currently preferred embodiments, the smoothing step is carried out with the applicator roller (32) rotating with a tangential velocity at least 2, 3, 4 or 5 times greater than the speed at which the applicator roller (32) is passed across the stage (15). For example, in one embodiment, the applicator roller (32) rotates at a tangential speed of 213 mm/second, and the smoothing step is carried out by passing the applicator roller (32) across the stage (15) at a speed of 30 mm/second.

The horizontal position of the applicator roller (32), the vertical position of the stage (15), drive speed and light projection from the light engine (40) can be controlled by microcontrollers which receive corresponding commands from a central computer unit. Communication between the computer unit and the microcontrollers can be done via the standard CAN bus.

Products

Photographs of products produced by methods as described above are shown in FIGS. 4A-4B. Depending on the resin and end use, additional post-production steps, such as cleaning/washing, baking, cutting/grinding, may also be required.

Figure 4A:
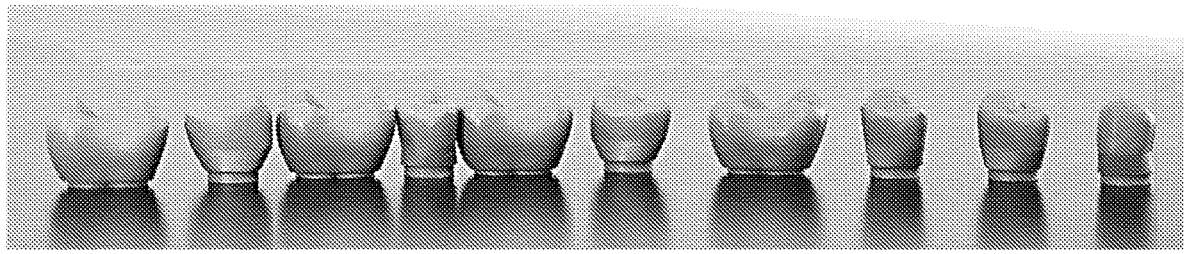
FIGS. 4A and 4B are photographs of exemplary three-dimensional objects formed according to methods described herein.
Figure 4B:
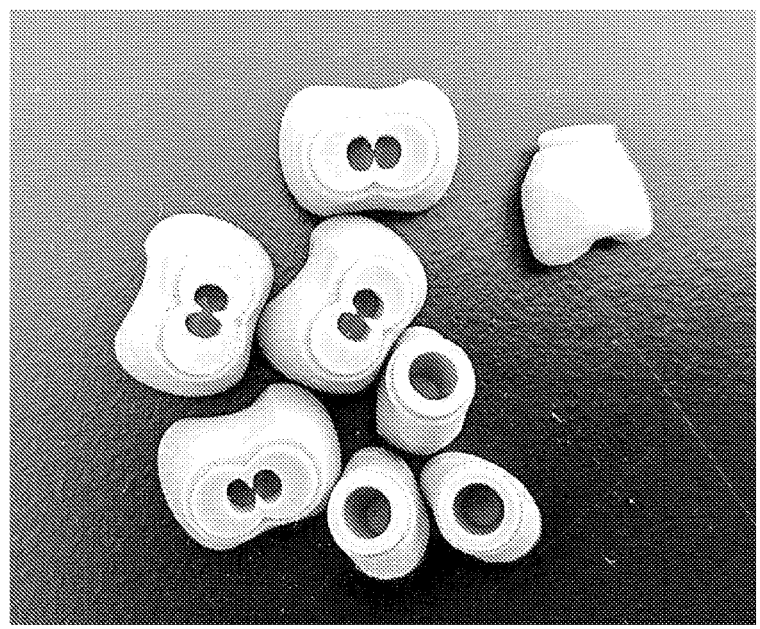

Also, while the products shown in FIGS. 4A-4B are illustrative of dental restorations such as crowns, bridges, implants, and the like (including portions thereof joined to other materials) it will be appreciated that other precision ceramic objects and parts can be produced in like manner, including tools, surgical instruments, cutters, bearings, gears (including spur gears, helical gears, rack and pinions, bevel gears, miter gears, worm gears, screw gears, etc.), and the like can also be made. In addition, while ceramic particles can be used in the resin to produce ceramic objects, other resins can be used (e.g., with metallic particles, to make metallic objects), including but not limited to objects such as those described above.

The foregoing is illustrative of the present invention, and is not to be construed as limiting thereof. The invention is defined by the following claims, with equivalents of the claims to be included therein.

We claim:
1. An additive manufacturing apparatus, comprising:
   a chamber having a planar circumferential top edge portion defining a chamber orifice;
   a stage movably positioned in said chamber, said stage having a planar top surface portion alignable with said chamber planar circumferential edge portion, the two together configured to receive a viscous resin;
   a dispenser facing said stage and operatively associated therewith, said dispenser configured to apply a planar coating of viscous resin to said stage planar top surface portion;
   a primary drive operatively associated with said dispenser and said chamber, said primary drive configured to move said dispenser across said chamber orifice;
   a light engine facing said stage and operatively associated therewith, said light engine configured to expose a coating of resin on said stage planar top surface to patterned light; and
   a stage drive operatively associated with said stage and configured to retract said stage into said chamber, following exposure of a coating of resin on said stage to patterned light;
   a resin reservoir;
   an applicator roller operatively associated with said reservoir; and
   a roller drive operatively associated with said applicator roller, wherein said applicator roller and roller drive are configured to be reversible between:
      (i) a first direction in which resin is pumped from said reservoir onto said stage; and
      (ii) a second direction in which excess resin is pumped from said stage into said reservoir while said dispenser moves across said chamber orifice to provide a smooth planar coating of said resin on said stage for subsequent exposure to patterned light.

2. The apparatus of claim 1, wherein said light engine is positioned above said stage.

3. The apparatus of claim 1, wherein said light engine is fixed and stationary.

4. The apparatus of claim 1, wherein said chamber is fixed and stationary.

5. The apparatus of claim 1, wherein said light engine comprises an ultraviolet (UV) light source.

6. The apparatus of claim 1, wherein said applicator roller is configured to completely span said chamber orifice.

7. The apparatus of claim 1, wherein said resin comprises a pseudoplastic paste.

8. An additive manufacturing apparatus, comprising:
   a chamber having a planar circumferential top edge portion defining a chamber orifice;
   a stage movably positioned in said chamber, said stage having a planar top surface portion alignable with said chamber planar circumferential edge portion, the two together configured to receive a viscous resin;
   a dispenser facing said stage and operatively associated therewith, said dispenser configured to apply a planar coating of viscous resin to said stage planar top surface portion;
   a primary drive operatively associated with said dispenser and said chamber, said primary drive configured to move said dispenser across said chamber orifice;

a light engine facing said stage and operatively associated therewith, said light engine configured to expose a coating of resin on said stage planar top surface to patterned light; and a stage drive operatively associated with said stage and configured to retract said stage into said chamber, following exposure of a coating of resin on said stage to patterned light;

a resin reservoir;

an applicator roller operatively associated with said reservoir; and a roller drive operatively associated with said applicator roller, wherein said applicator roller and roller drive are configured to be reversible between:
  (i) a first direction in which resin is pumped from said reservoir onto said stage; and
  (ii) a second direction in which excess resin is pumped from said stage into said reservoir while said dispenser moves across said chamber orifice to provide a smooth planar coating of said resin on said stage for subsequent exposure to patterned light, wherein said light engine is positioned above said stage, and wherein said chamber is fixed and stationary.

9. The apparatus of claim 8, wherein said light engine is fixed and stationary.

10. The apparatus of claim 8, wherein said light engine comprises an ultraviolet (UV) light source.

11. The apparatus of claim 8, wherein said applicator roller is configured to completely span said chamber orifice.

12. The apparatus of claim 8, wherein said resin comprises a pseudoplastic paste.

* * * * *